M. WAGENHORST.
DISH WASHER.
APPLICATION FILED SEPT. 9, 1916.

1,306,089.

Patented June 10, 1919.
2 SHEETS—SHEET 1.

Inventor,
Mary Wagenhorst,
By Hull Smith Brock & West
Attys.

M. WAGENHORST.
DISH WASHER.
APPLICATION FILED SEPT. 9, 1916.

1,306,089.

Patented June 10, 1919.
2 SHEETS—SHEET 2.

Inventor,
Mary Wagenhorst.

UNITED STATES PATENT OFFICE.

MARY WAGENHORST, OF AKRON, OHIO.

DISH-WASHER.

1,306,089. Specification of Letters Patent. Patented June 10, 1919.

Application filed September 9, 1916. Serial No. 119,155.

*To all whom it may concern:*

Be it known that I, MARY WAGENHORST, a citizen of the United States, residing at Akron, in the county of Summit and State of Ohio, have invented a certain new and useful Improvement in Dish-Washers, of which the following is a full, clear, and exact description, reference being had to the accompanying drawings.

This invention relates generally to dish washers and more particularly to a combined dish washer and drainer in which the force of the water is utilized to excoriate the dishes and thereby quickly and thoroughly remove every particle of the matter adhering thereto; and another object of the invention is to so combine and arrange the parts that the cleansing and draining operations can be accomplished in the quickest and easiest manner and a still further object is to provide a device in which the moistening effects of steam can be utilized to and in the removal of matter adhering to the dishes.

Another object of the invention is to provide a dish washer which can be used in connection with the ordinary sink faucet, or in connection with a pressure apparatus, in cases where the faucet connection is not possible.

With these various objects in view, the invention consists in the novel features of construction and combination hereinafter fully described and pointed out in the claims.

Figure 1:
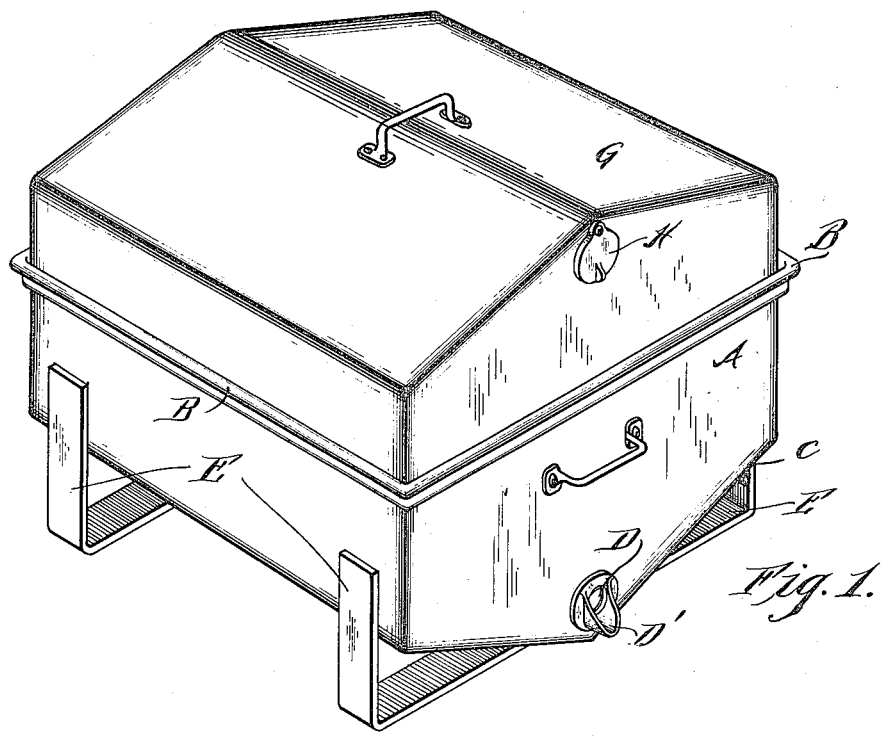
Figure 4:
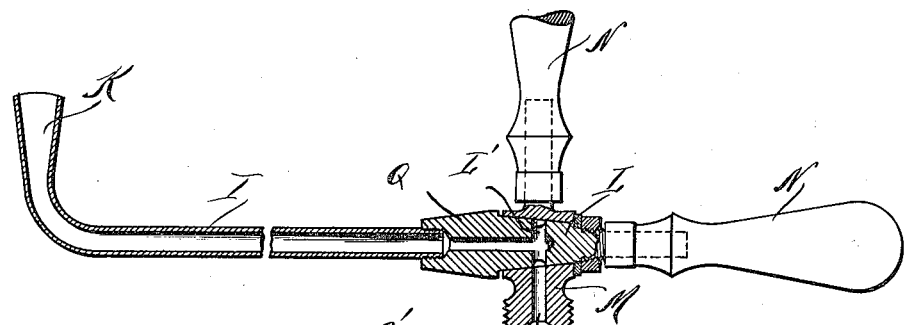
Figure 5:
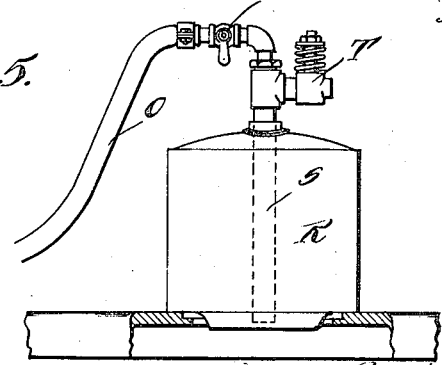
Figure 2:
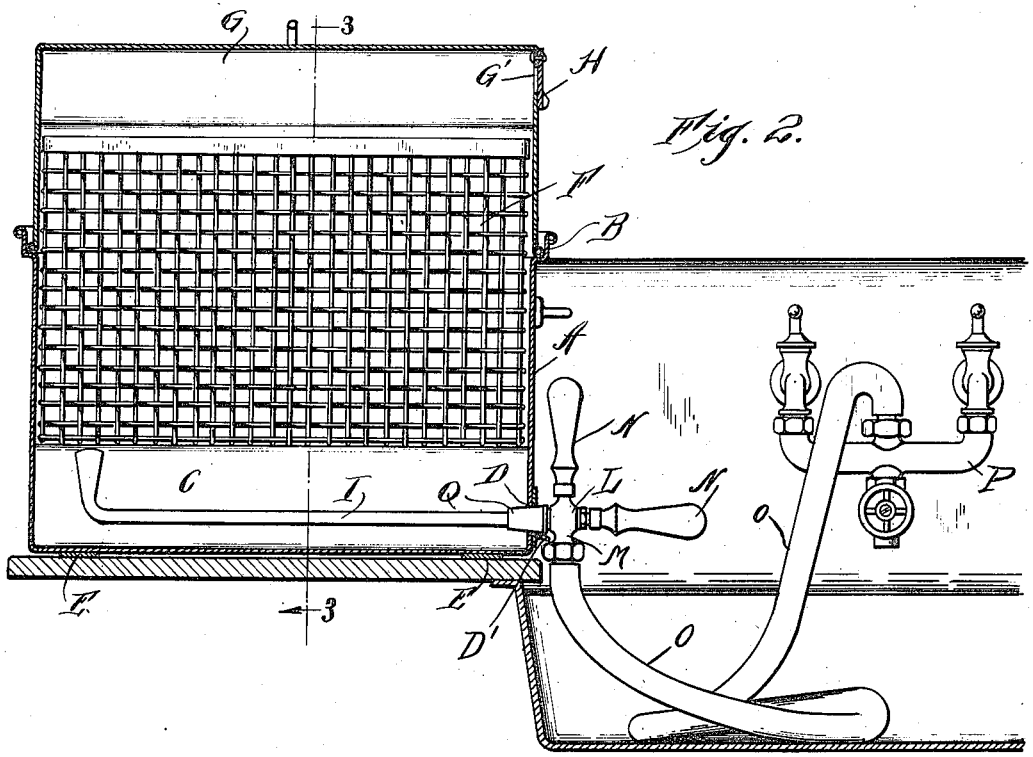
Figure 3:
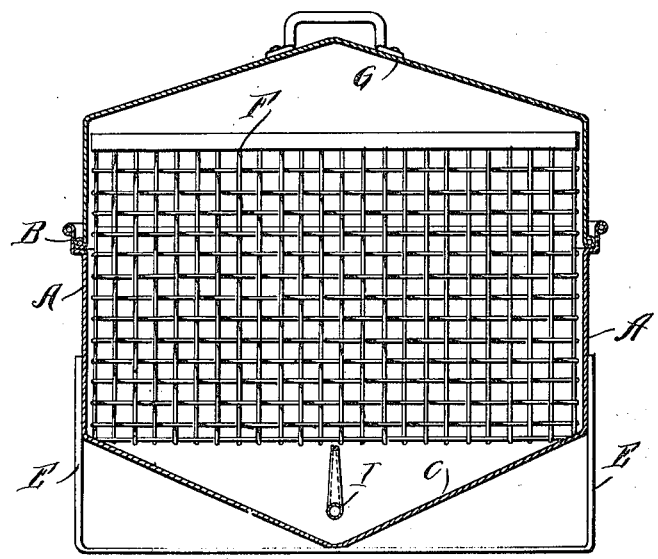

In the drawings forming a part of this specification Figure 1 is a perspective view of one form of dish washer embodying my invention; Fig. 2 is a sectional view illustrating the manner of using the same; Fig. 3 is a section on the line 3—3 of Fig. 2; Fig. 4 is a detail sectional view of the movable nozzle; and Fig. 5 is a detail view of one form of pressure apparatus to be used in connection with the washer where the faucet connection is not possible.

In the practical embodiment of my invention, I employ a metallic box or receptacle A having the shouldered upper edges B, the bottom of this receptacle being preferably inclined or trough shaped as shown at C, and at one end of the box or receptacle is the opening D having a lip D' for the purpose of discharging or returning the water into the sink, the washer being preferably arranged upon the drain board at one side of the sink as most clearly shown at Fig. 2. The box or receptacle A may be provided with feet or supports E of any suitable construction.

F indicates a basket or cage of reticulated construction and preferably made of wire. This basket or cage can be used as a trap to collect the dishes in and is of a size to fit within the box or receptacle A and rest upon the inclined sides of the trough shaped bottom as shown in Figs. 1 and 2 thereby leaving a considerable central space beneath the wire basket or cage. This wire basket or cage is intended to receive the dishes to be washed and which may be placed therein as they are gathered from the table. This basket or cage may be subdivided if desired, or provided with racks or supports for maintaining the dishes in any particular positions, although no particular arrangement is necessary.

The cover G fits into the offset edge of the box or receptacle A and is of such a size that a trough is provided surrounding the lower edge of the cover for the purpose of catching any water which might be forced out between the top of the receptacle and cover. The top of the cover has a handle and may be shaped as desired. At one end it is provided with an opening G' normally closed by means of a pivoted plate H which will prevent the escape of water during the operation of the device.

The nozzle I is tubular in form and of considerable length and at its inner end is bent at a right angle and flattened thereby providing a restricted and elongated discharge nozzle through which the water issues with great velocity and force and in the form of a thin sheet. This nozzle is inserted through the opening D and owing to the length of the tube I, can be worked back and forth beneath the entire length of the wire basket containing the dishes to be washed. The outer end of the tube I is connected to a tapered plug L having the bores or passages L' produced therein, this plug being arranged in the usual casing or connection M having the passage M' which communicates with the passage L' and delivers the water to the tube I, and for the purpose of manipulating the washing nozzle a handle N can be connected to the plug L or casing M as preferred. A flexible connection O extends from the casing M to the union P which in turn is connected to the ordinary sink faucets and by means of which either hot or cold water or both can be delivered to the washer through the hose connection O as most clearly shown in Fig. 2 without interfering with the use of the sink faucet.

The taper of the plug L is such that said plug can be inserted in the opening D whenever it is desired to retain water within the receptacle, and experience has shown that by closing this opening and introducing steaming hot water the steam or vapor arising therefrom will quickly loosen any particles or matter which have adhered to the dishes.

When the plug is not inserted in the opening D the nozzle is worked back and forth in the receptacle, and it can be rocked a turn from side to side as it is so moved back and forth, and in this manner every part of the receptacle can be reached with a forcefully projected stream of water.

In operation the dishes are collected and arranged in the wire basket which is arranged in the receptacle and the cover placed thereon. The elongated nozzle is then inserted through the opening D and the water turned on. By means of the handle the nozzle can be worked longitudinally back and forth beneath the entire length of the dish containing basket and at the same time it can be rocked or vibrated transversely so as to throw the stream of water from side to side thereby reaching every part of the receptacle and consequently all of the contents thereof. Owing to the peculiar and restricted shape of the discharge nozzle, the water at ordinary street main pressure issues from said nozzle with great force and velocity thereby producing a cutting or excoriating action with reference to the matter contained upon the dishes thereby quickly and easily removing the same, and the water with all matter so removed drains down and passes out through the opening into the sink; and if hot water is employed the washing operation can be quickly accomplished and the dishes then remaining permitted to drain and dry.

If for any reason it is desired to entrap the water and subject the dishes to a soaking for any considerable length of time the plug is inserted and water turned on as previously described and continued until the desired amount of water has been accumulated.

In addition to washing the dishes thoroughly from the bottom it is also possible to subject them to a similar action from the top by withdrawing the nozzle from the hole D, turning the plate H to one side and inserting the nozzle through the opening G' and manipulating the nozzle back and forth and from side to side exactly the same as below the dish basket.

By means of a device constructed as herein shown and described, dishes can be thoroughly cleansed with ease in a remarkably short space of time.

Wherever water main pressure cannot be had, a suitable boiler or kettle R can be provided having a pipe S extending nearly to the bottom thereof and to which the hose connection O can be attached, said pipe S having any approved type of blow-off valve T to relieve excessive pressure. By means of this construction it is obvious that as the water within the boiler or kettle S begins to boil, pressure will be created which will force the boiling water up through the pipe S and then by turning on the cock O', boiling hot water under pressure can be delivered to the dish washer, it being understood that the hose connection O is connected with the casing M in exactly the same manner as shown in Fig. 2.

Having thus described my invention, what I claim is:—

1. In a dish washer a combination with a receptacle having an opening, of a cover for said receptacle, a basket adapted to rest within said receptacle and cover, an elongated nozzle having a restricted discharge orifice, means for supplying water under pressure to said nozzle, said nozzle being movable back and forth in the receptacle and also turnable from side to side thereof.

2. In a dish washer the combination with a receptacle having an opening therein, of a cover for said receptacle, a basket adapted to be contained within said receptacle, an elongated tubular nozzle passing through said opening, the inner end of said tubular nozzle being bent at a right angle and having a restricted discharge orifice, a water supply connection for said nozzle, said nozzle being movable back and forth through the opening and turnable upon its axis from side to side.

3. In a dish washer, the combination with a receptacle adapted to receive dishes and having an opening therein, of an elongated nozzle projectable through said opening, the inner end of said nozzle being flattened, and a hose connected to the outer end of said nozzle, said nozzle as a whole being movable back and forth and turnable from side to side within said receptacle.

4. In a dish washer, the combination with a receptacle adapted to receive dishes and having an opening therein, of an elongated nozzle projectable through said opening, the discharge end of said nozzle being bent at an angle to the body of said nozzle and contracted.

5. In a dish washer, the combination with a receptacle having an opening near the bottom thereof, a cover for said receptacle, a basket adapted to rest within said receptacle and cover, an elongated nozzle having a restricted discharge orifice, means for supplying water under pressure to said nozzle, and a plug arranged upon said nozzle and adapted to close the opening in said receptacle.

6. In a dish washer, the combination with a receptacle having an opening near the bottom thereof, of a cover for said receptacle, a basket adapted to rest in said receptacle, an elongated nozzle having a restricted discharge end, a bored plug to which said nozzle is connected, and a water supply pipe connected to said bored plug, said nozzle being movable back and forth in said receptacle and turnable on its axis to direct water to any part of said receptacle.

7. In a dish washer, the combination with a receptacle adapted to receive dishes and having an opening therein, of an elongated nozzle projectable through said opening, the discharge end of said nozzle being bent at an angle to the body portion flattened and widened thereby providing a long narrow discharge orifice.

In testimony whereof, I hereunto affix my signature.

MARY WAGENHORST.